May 8, 1945.    L. BOLLE    2,375,518
METHOD FOR THE MANUFACTURE OF SHAPED PARTS MADE
OUT OF A SUPPLE, ELASTIC, NONMETALLIC MATTER
Filed April 18, 1944

INVENTOR
LEON BOLLE,
BY *William Herbstroff*
ATTORNEYS.

Patented May 8, 1945

2,375,518

UNITED STATES PATENT OFFICE 2,375,518

METHOD FOR THE MANUFACTURE OF SHAPED PARTS MADE OUT OF SUPPLE, ELASTIC, NONMETALLIC MATTER

Léon Bolle, Geneva, Switzerland

Application April 18, 1944, Serial No. 531,674
In Switzerland May 21, 1943

12 Claims. (Cl. 164—18)

For manufacturing shaped parts out of a supple, elastic, non-metallic material, one generally has reccurse to molding, this method being actually the one which affords by far the most possibilities in the choice of the shape the most appropriate to the purpose for which the part is made.

But this method becomes extremely expensive as soon as the parts to be manufactured are small, and in such cases, one tries to use only parts having a shape which can be obtained by simply cutting them out of semi-manufactured material such as plates, sheets, tubes or profiled rods.

When cutting a piece out of, for example a sheet of a supple, elastic, non-metallic material (such as rubber for instance) one generally uses a knife composed of a thin blade which, while penetrating perpendicularly in the sheet, cuts out of it a part having a profile corresponding to the shape of the surface generated by the knife-edge during the cutting-out process.

Such a part must therefore always be limited by two paralleled faces and by at least one lateral surface or edge perpendicular to the said faces.

The same is the case when one cuts a tube or profiled-rod perpendicularly to its longitudinal generatrice line, the cut surfaces being perpendicular to the external face or faces of the shaped part corresponding to the profile of the tube or rod used.

Employing the method of manufacture covered by this present invention, it is possible to cut out from a semi-manufactured piece of material, such as a plate, a sheet, a tube or a profile rod by means of a tool having a cutting edge, a piece or pieces having at least certain portions of its cut surface which are not constituted by a continuous system of generatrice lines which are parallel to a given direction.

According to the method of the present invention, at least during a part of the cutting process, the semi-manufactured material is subjected to a local deformation which forces a certain portion of the material which portion before the semi-manufactured material is deformed is situated on one side of the surface generated or traversed by the knife-edge during the cutting process, to pass on the other side of the said surface.

In carrying out this method one can cut out the part by means of a sharp tool with a rectilinear motion whereby during at least a part of the cutting process, the semi-manufactured material is subject to a local deformation which forces a certain portion of material which in natural state and before the semi-manufactured material is deformed, is situated on one side of the surface generated or traversed by the knife-edge during the cutting process, to pass on the other side of the said surface.

The local deformation of the semi-manufactured material can be caused by subjecting the said material in the vicinity of the surface generated by the cutting tool to a compression or pressure which is not the same on one side of the cutting tool as on the other, or by local flanging or fashioning of the semi-manufactured material.

One can also cause the desired local deformation of the semi-manufactured material by subjecting said material to a compression or to a traction in the vicinity of the cutting tool applied either on both sides or on one side of the surface generated by the knife-edge of the tool so as to force a certain portion of material which in unrestrained state and before the semi-manufactured material is deformed, is situated on one side of the surface generated by the knife-edge during the cutting process, to pass on the other side of the said surface.

Furthermore the desired local deformation of the semi-manufactured material can be attained by subjecting said material to a compression or a traction applied either or both sides or on one side of the surface generated by the knife-edge of the tool, combined with a flanging or a fashioning of at least a part of the material situated on one side of the surface generated by the cutting tool during the cutting process so as to force certain portion of matter which in natural state and before the semi-manufactured material is deformed, is situated on one side of the surface generated by the knife-edge during the cutting process, to pass on the other side of the said surface.

The drawing annexed shows examples of application of this method.

Figure 10:

Fig. 10 concerns an alternative method wherein annular pieces are formed from sheets by concentric cutters.

Figure 1:
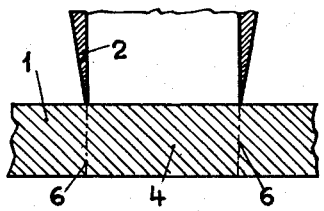
Figs. 1 to 6 are applications of parts cut from a sheet.
Figure 2:
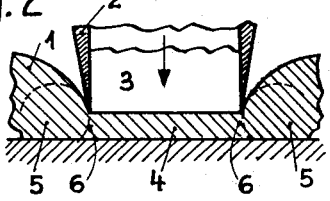
Figure 3:
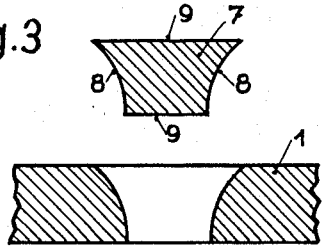

In the case of Figs. 1 to 3, one uses a sheet 1 of material, for example rubber, to obtain a part or piece with a circular cross section having in its normal unrestrained state two faces of different diameters. For this purpose, a sharp tool 2 is used comprising a thin circular cutting edge. If the sheet were not subjected to any local deformation during the cutting process, the cut surface of the part or piece would be constituted by the cylinder 6 generated by the cutting edge of the knife penetrating in the material.

However, in carrying out the method of the present invention (Fig. 2) the part 4 of the sheet I situated inside the surface 6 is compressed while the cutting is in progress by a piston 3 so that a certain portion of the material 5 is expelled to the other side of the said surface 6.

Once the piece as upon cut out, the material comes back to its natural undeformed state owing to its elasticity, and the cut piece assumes the shape shown on Fig. 3. As shown, the cut surface 8 is no longer constituted by a continuous system of generatrice lines all parallel to a same given direction, for example parallel to the direction in which the cutting tool moves when it penetrates into the semi-manufactured material.

Figure 4:
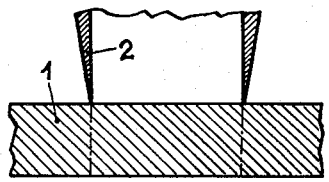
Figure 5:
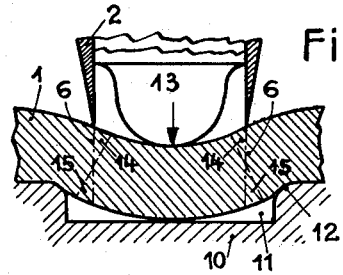
Figure 6:
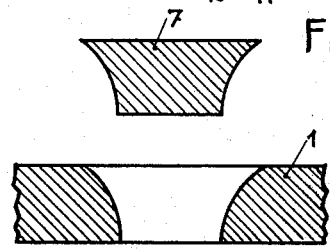

In the example of the embodiment shown on Figs. 4 to 6 one also starts with a sheet I to obtain a piece of circular section. In this case sheet I lies on a support 10 provided with a recess II having its corner 12 rounded off and being situated opposite the cutting tool 2. The diameter of recess II is greater than that of tool 2. During the cutting process, the sheet I is pushed down in the recess II by a piston I3 disposed concentrically to the cutting tool, the said piston having its extremity rounded off.

The local fashioning or flanging to which the sheet is submitted during the cutting process, forces certain portions of matter 14 and 15 which before the sheet is deformed were situated on one side of the surface generated by the cutting edge of the tool during the cutting process, to pass to the other side of the said surface. The consequence is that after the operation is performed and when the material has assumed again its natural state, the piece cut out 7 and the sheet I will have the shapes shown in Fig. 6.

One could also arrange to have two concentric knife-edges cutting the material simultaneously whereby it would be possible to manufacture, by the method described above, annular pieces such as shown in Fig. 10. It is possible also to compress and obtain a local deformation of the sheet, only after the cutting process has begun, or during any given fraction of the travel of the knife-edge through the thickness of the sheet so as to manufacture pieces having only part of their cut surfaces not constituted by a continuous system of generatrice lines parallel to a given direction.

Figure 8:
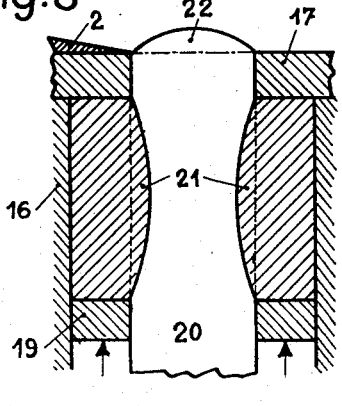
Figs. 7 to 9 are applications of parts cut from a shaped rod.
Figure 7:
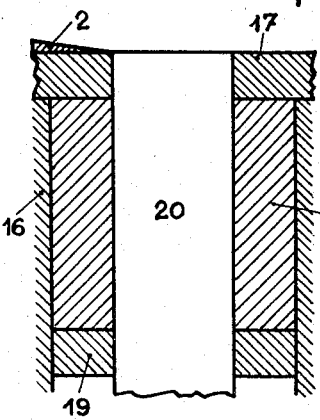
Figure 9:

In the case of Figs. 7 to 9 a rod or wire with circular cross section is used to obtain pieces having the same shape.

A holder having the shape of a tube 16 (Fig. 7) is provided at one extremity with a closure 17 provided with a central opening having the same dimensions and the same shape as the section of the rod which has to be cut. A tubular element 18 made of elastic material, such as rubber and having an external diameter equal to that of the holder 16 and an internal diameter equal to that of the rod 20 which has to be cut, is placed inside the holder so as to butt up against the closure 17. An annular piston 19 compresses the tubular element 18 against the closure 17 as shown on Fig. 8. Under the pressure exerted by the piston 19, the element 18 is deformed, as shown on Fig. 8, driving its parts 21 into the rod and thereby forcing protruding part 22 out through the opening of the closure 17. If a sharp tool 2 is displaced in front of the closure 17 perpendicularly to the rod, it will cut away from the rod pieces having the shape shown in Fig. 9.

One could proceed in the same manner with a tube of the material instead of the rod 20 so as to produce annular pieces.

Different shapes can be obtained for the pieces cut out by the choice of degree of deformation to which the material is submitted during the cutting process or by varying the value of the deformation during the cutting process.

One could also obtain the local deformation of the material which has to be cut by compressing it on both sides of the cutting edge with different intensities, the example shown in Figs. 1 to 3 being a particular case where one of these intensities is zero.

The deformation of the material can also be attained by submitting the semi-manufactured material to a tension or pull instead of a compression or a pressure.

The local deformation created during the cutting process can also be chosen as to exceed the elastic limit of the material which would in this case suffer a permanent set and retain a permanent deformation.

The method can also be applied to other materials than rubber having the necessary elastic characteristics.

I claim:

1. A method for the manufacture of shaped parts out of supple, elastic and non-metallic material, using the said material in any of the semi-manufactured forms which can be obtained in commerce, the said method consisting in cutting out the parts by means of a sharp tool translated with a rectilinear motion whereby during at least a part of the cutting process, the semi-manufactured material is subjected to a local deformation caused by subjecting the said material in the vicinity of the surface generated by the cutting tool to a compression or pressure which is not the same on one side of the said generated surface as on the other and which causes a certain portion of material, which in natural unrestrained state and before the semi-manufactured material is deformed is situated on one side of the surface engendered by the knife-edge during the cutting process, to pass on the other side of the said surface.

2. A method for the manufacture of shaped parts out of supple, elastic and non-metallic material, consisting in cutting out the parts by means of a sharp tool translated with a rectilinear motion whereby during at least a part of the cutting process, the semi-manufactured material is subject to a local deformation of such degree that the piece cut out retains a permanent deformation which obliges a certain portion of material which in natural undeformed state and before the semi-manufactured material is deformed is situated on one side of the surface generated by the knife-edge during the cutting process, to pass on the other side of the said surface.

3. A method for the manufacture of shaped parts out of supple, elastic and non-metallic material, consisting in cutting out the part by means of a sharp tool translated with a rectilinear motion whereby during at least a part of the cutting process, the semi-manufactured material is subjected to a local deformation obtained by tension which forces a certain portion of matter which in natural state and before the semi-manufactured material is being deformed is situated on one side of the surface generated by the knife-edge during the cutting process, to pass to the other side of the said surface.

4. In the excision of shaped articles from bodies of elastic deformable material, the method of cutting out finished articles having diameters perpendicular to the thickness dimension which vary at different points of depth in the thickness dimension, which consists in cutting said material in the direction of the thickness dimension thereof on a surface formed to enclose an area substantially similar to a cross section of the desired article perpendicular to the thickness dimension at a determined point of its thickness, and at the same time applying on the opposite sides of and adjacent to said cutting surface in directions substantially parallel to the thickness dimension, two forces of unequal magnitude, whereby laminae of said body at different points in the depth through the thickness thereof are unequally deformed during cutting.

5. The method of claim 4, said applied forces being forces of compression.

6. The method of claim 4, said applied forces being forces of tension.

7. The method of claim 4, said applied forces being of sufficient magnitude to exceed the elastic limit of said material and cause a permanent deformation thereof.

8. In the excision of annular shaped articles from bodies of elastic deformable material, the method of cutting out finished articles having diameters perpendicular to the thickness dimension which vary at different points of depth in the thickness dimension, which consists in cutting said material in the direction of the thickness dimension thereof on two spaced concentric surfaces, and at the same time applying on the opposite sides of and adjacent to said cutting surfaces in directions substantially parallel to the thickness dimension, two forces of unequal magnitude, whereby laminae of said body at different points in the depth through the thickness thereof are unequally deformed during cutting.

9. In apparatus for cutting a shaped part from a body of elastic deformable material, a casing surrounding said body in spaced relation, closure means for closing the space between said body and said casing adjacent one end of said body, said closure means being centrally apertured for permitting the end of said body to protrude therethrough, centrally apertured piston means slidably positioned between said casing and said body adjacent the other end thereof and closing the space therebetween, elastic deformable means mounted in the space between said casing and said body and between said closure means and said piston means and adapted to apply lateral pressure to said body when said piston means is urged inwardly and to cause the end of said body to protrude beyond said closure means, and cutting means adjacent the outer surface of said closure means for cutting off said protruding portion of said body.

10. In apparatus for cutting a shaped part from a body of elastic deformable material, a bed plate provided with a cup-shaped recess and adapted to support said body, a cutting knife forming a substantially closed surface and adapted to fit within said recess in spaced relation to the periphery thereof, and means for propelling said knife against said body positioned on said bed plate over said recess in a direction substantially perpendicular to said bed plate and in spaced relation to the periphery of said recess.

11. In apparatus for cutting a shaped part from a body of elastic deformable material, a bed plate provided with a cup-shaped recess and adapted to support said body, a cutting knife forming a substantially closed surface and adapted to fit within said recess in spaced relation to the periphery thereof, means for propelling said knife against said body positioned on said bed plate over said recess in a direction substantially perpendicular to said bed plate and in spaced relation to the periphery of said recess, piston means mounted within said cutting knife and adapted to apply pressure to said body to force the same down in said recess, and means for propelling said piston means to so force said body down in said recess while said knife is cutting said body.

12. In apparatus for cutting a shaped part from a body of elastic deformable material, a bed plate provided with a cup-shaped recess and adapted to support said body, a cutting knife forming a substantially closed surface and adapted to fit within said recess in spaced relation to the periphery thereof, means for propelling said knife against said body positioned on said bed plate over said recess in a direction substantially perpendicular to said bed plate and in spaced relation to the periphery of said recess, piston means mounted within said cutting knife and adapted to apply pressure to said body to force the same down in said recess, and means for propelling said piston means to so force said body down in said recess while said knife is cutting said body, the material engaging end of said piston means being rounded and substantially spaced from said cutting knife.

LÉON BOLLE.